UNITED STATES PATENT OFFICE.

WILHELM HERZBERG, OF BERLIN-WILMERSDORF, AND OSWALD SCHARFENBERG, OF BERLIN-SCHÖNEBERG, GERMANY, ASSIGNORS TO ACTIEN GESELLSCHAFT FÜR ANILIN FABRIKATION, OF BERLIN, GERMANY.

SULFUR DYES.

1,209,580.  Specification of Letters Patent.  Patented Dec. 19, 1916.

No Drawing. Original application filed February 26, 1912, Serial No. 679,993. Patent No. 1,102,171, dated June 30, 1914. Divided and this application filed March 22, 1913. Serial No. 756,233.

*To all whom it may concern:*

Be it known that we, WILHELM HERZBERG and OSWALD SCHARFENBERG, citizens of the German Empire, residing at Berlin-Wilmersdorf, Germany, and Berlin-Schöneberg, Germany, respectively, our post-office addresses being Prinzregentenstrasse 12, Berlin-Wilmersdorf, Germany, and Wartburgstrasse 8, Berlin-Schöneberg, Germany, respectively, have invented certain new and useful Improvements in Sulfur Dyes, of which the following is a specification.

In a co-pending application we claim the manufacture of new sulfur dyes which derive from a special kind of indophenols, these indophenols deriving from perimidin or dihydroperimidone-2 or dihydrothioperimidone-2, *i. e.* heteronuclearic derivatives of 1.8-naphthylenediamin, and para-aminophenol or its derivatives or quinone-chlorimid or its derivatives respectively.

Now in the present invention we claim new sulfur dyes manufactured from indophenols which derive from other heteronuclearic derivatives of 1.8-naphthylenediamin and from para-aminophenol or its derivatives or quinonechlorimid or its derivatives respectively.

The general structure of the perimidin derivatives underlying the new indophenols serving as parent material for our present invention is represented by the following general formula:

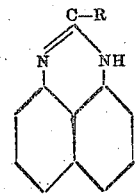

in this formula R representing an organic radical, so that R is an alkyl group or aryl group or aralkyl group or alkaryl group or the like. The new indophenols in question derive therefore for example from methylperimidin.

In manufacturing the new sulfur dyes the new indophenols may be acted upon with an alkali-polysulfid containing a high or low percentage of sulfur; furthermore a suitable solvent, such as alcohol or water, or a suitable diluent may be added.

The following example serves to illustrate our invention, the parts being by weight: 40 parts of a sodium sulfid solution containing 22 per cent. of $Na_2S$ are added with 13 parts of sulfur and after dissolving the sulfur by gently heating 70 parts of alcohol are added; into the mass thus obtained 14 parts of the indophenol derived from 2.6-dichlor-para-aminophenol and methyl-perimidin are introduced whereupon the mass is heated at the reflux condenser during about 60 hours. The formation of the dyestuff being finished it is isolated in the usual manner for instance by distilling over the alcohol, adding a suitable quantity of water to the mass and introducing a current of air. The new dye thus obtained in the dry state when pulverized forms a black powder practically insoluble in concentrated sulfuric acid and insoluble in alcohol, benzene, nitrobenzene, ether and the other usual solvents. It dissolves in an alkaline hydrosulfite solution to a brownish-yellow solution and in sodium sulfid to a green solution. From a dye-bath containing sodium-sulfid cotton is dyed without a mordant full dark green tints which possess a good fastness.

Of course it is obvious that the present invention is not limited to the foregoing examples or to the details given therein.

It is to be understood that the proportions of the ingredients and the special conditions of reaction may be altered without departing from the spirit of the invention.

Having now described our invention and the manner in which it may be carried out what we claim is,—

1. As new articles of manufacture new sulfur dyes, being sulfur containing derivatives of the indophenols obtainable from a perimidin compound of the general formula:

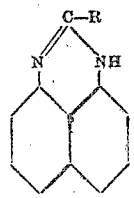

in which R means an organic radical, and from a para-aminophenol, these new dyes being in the dry shape when pulverized dark powders insoluble in the usual solvents, but being soluble in an alkali-sulfid solution to green solutions and being soluble in an alkaline hydrosulfite solution to, generally speaking, brown to yellow solutions, and these new sulfur dyes producing on cotton from a bath containing an alkali-sulfid, generally speaking, full green tints.

2. As a new article of manufacture the new sulfur dye being a sulfur containing derivative of the indophenol obtainable from methyl-perimidin having the formula:

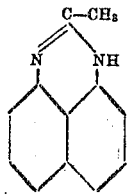

and from 2.6 - dichloro - para - aminophenol, which new dye is when dried and pulverized a black powder, practically insoluble in concentrated sulfuric acid, alcohol, benzene, nitrobenzene, ether and the other usual solvents, and which new dye is soluble in a sodium-sulfid solution to a green solution and is soluble in an alkaline hydrosulfite solution to a brownish yellow solution, and this new dye producing on cotton from a bath containing an alkali-sulfid a full dark green possessing a good fastness.

In testimony whereof we have hereunto set our hands in presence of two subscribing witnesses.

WILHELM HERZBERG.
OSWALD SCHARFENBERG.

Witnesses:
HENRY HASPER,
WOLDEMAR HAUPT.